United States Patent [19]

Hamilton et al.

[11] 4,251,011

[45] Feb. 17, 1981

[54] MACHINES FOR HANDLING SEEDS

[76] Inventors: Thomas W. Hamilton, 27 Clevehurst Close, Stokes Poges, Buckinghamshire; Thomas D. Hamilton, 9 Grafton Close, Maidenhead, Berkshire; Timothy J. Hamilton, 7 Crossways Court, Osborne Rd., Windsor, Berkshire, all of England

[21] Appl. No.: 85,829

[22] Filed: Oct. 17, 1979

[30] Foreign Application Priority Data

Oct. 19, 1978 [GB] United Kingdom ............... 41217/78

[51] Int. Cl.³ .............................................. A01C 7/04
[52] U.S. Cl. .................................... 221/211; 221/251; 221/204
[58] Field of Search ............... 221/211, 278, 204, 251; 111/1

[56] References Cited

U.S. PATENT DOCUMENTS

| | | | |
|---|---|---|---|
| 3,387,746 | 6/1968 | Whipple | 221/211 |
| 3,627,173 | 12/1971 | Kerker | 221/211 |
| 3,693,833 | 9/1972 | Weitz | 221/211 |
| 3,738,530 | 6/1973 | Fine | 221/211 |
| 3,757,996 | 9/1973 | Lienemann | 221/211 |
| 3,770,164 | 11/1973 | Hembree | 221/211 |
| 4,004,713 | 1/1977 | Visser | 221/211 |
| 4,117,953 | 10/1978 | DeHart | 221/211 |

Primary Examiner—Allen N. Knowles
Attorney, Agent, or Firm—Sughrue, Rothwell, Mion, Zinn and Macpeak

[57] ABSTRACT

A machine for picking up seeds from a mass of seeds and depositing the seeds individually comprises a row of suction heads each having a suction duct terminating in an orifice and a container for holding the mass of seeds. The row of heads are pivotally mounted and are provided with a driving mechanism which swings the heads to and fro along a path between a pick-up position in which each of the orifices is adjacent the container and a discharge position in which seeds picked up by suction through the orifices are discharged. In order to enable each head to discharge at the discharge position only a single natural seed rather than a pelleted seed, a wiper member is provided and extends parallel to the row of heads in their path between the pick-up position and the discharge position. The wiper member has a curved surface and the heads swing close to this surface just before they reach the discharge position. The surface is so shaped that a tapering space is formed between the surface and a flat circular surface surrounding the orifice of each head and this tapering space is of sufficient width to hold a single seed, but squeezes surplus seeds away from the orifice of each head as the orifice passes over the curved surface.

13 Claims, 7 Drawing Figures

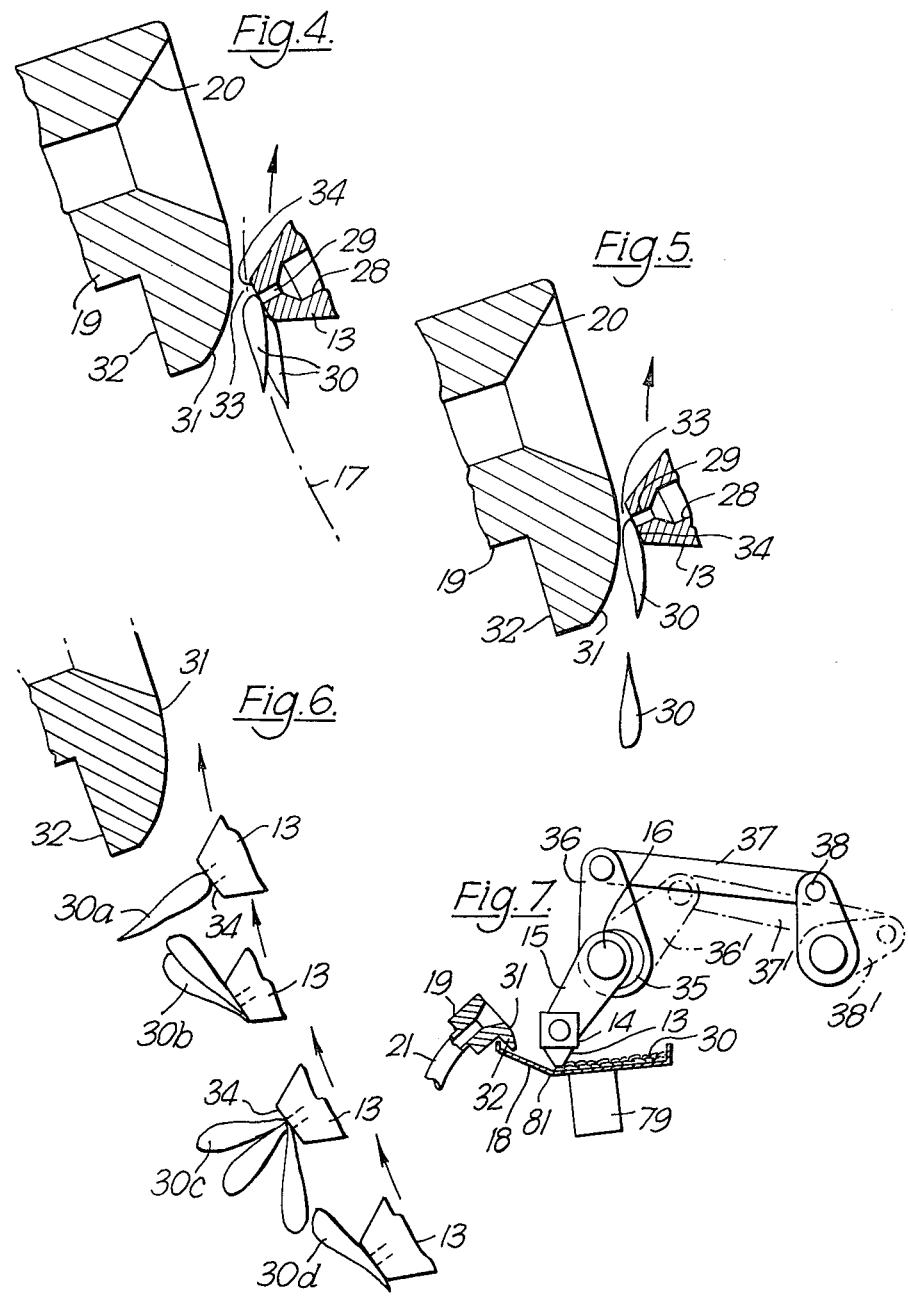

MACHINES FOR HANDLING SEEDS

In one conventional technique for raising vegetables such as lettuce, celery or cabbages commercially under glass, the seeds are inserted individually into holes in small blocks of nutrient material such as compressed peat. The seeds germinate and the seedlings grow one in each block and then the blocks are planted spaced apart in the ground for the lettuces or other plants to continue to grow until they are ready for picking.

Generally the operations are carried out on a large scale and enormous numbers of the seeds accordingly have to be inserted one in each block. Because of the large numbers involved, it is necessary to mechanise the operation of the feeding of the seeds one at a time into the holes in the blocks.

One kind of machine for performing the operation of picking up the seeds from a mass of seeds and then depositing the seeds singly comprises a suction head having a suction duct terminating in an orifice, a container for holding the mass of seeds, a mechanism for moving the head to and fro along a path between a pick-up position in which the orifice is adjacent the container and a discharge position, and means for applying suction to the duct when the head is in the pick-up position and is moving from the pick-up position to the discharge position and for removing the suction when the head is in the discharge position.

Machines of this kind operate very satisfactorily with seeds such as cabbage seeds which are substantially spherical. For this purpose the orifice is made of a diameter somewhat smaller than that of the seed and accordingly when the orifice is moved to the container, a single seed is sucked up to the orifice and entirely blocks the orifice so that the head is only capable of holding a single seed.

In practice the machine comprises a number of similar heads arranged side by side and the blocks of nutrient material are moved in rows step by step so that in each cycle of operations a row of blocks is situated below the discharge positions of the heads so that each head discharges one seed into one of the blocks in the row and after this the heads move back towards the seed container and the conveyor moves a further row of blocks into position for receiving the seeds.

However, existing machines of the kind described above will not operate satisfactorily with seeds, of which lettuce seeds are a particular example, which are elongated and sharply pointed at one end. If existing machines of the kind described are used with such seeds, the orifice of each head may pick up a single seed in such a way that the seed blocks the orifice and prevents it from picking up any further seeds, but more commonly the seeds are sucked up into the orifices by their pointed ends and each head then picks up two or more seeds at one time. All of the seeds picked up by one head are deposited in the hole in a single block of nutrient which means that a cluster of seedlings grow in the block and this is entirely unsatisfactory.

The only way in which this difficulty has so far been overcome is by pelleting the lettuce or other elongated pointed seeds so that the pelleted seeds are then substantially spherical and can be picked up effectively one at a time by the suction heads. However, at present the cost of pelleted lettuce seeds is frequently as much as seven times the cost of unpelleted seeds. In consequence considerable savings in costs could be made by the use of unpelleted seeds in place of the pelleted lettuce seeds and accordingly considerable efforts have been made to develop a machine which is capable of picking up elongated pointed seeds, such as lettuce seeds, from a mass of seeds and then depositing the seeds singly.

The aim of the present invention is to overcome this problem and to this end according to this invention, a machine for picking up seeds from a mass of seeds and depositing the seeds individually comprises a suction head having a suction duct terminating in an orifice, a container for holding the mass of seeds, a mechanism for moving the head to and fro along a path between a pick-up position in which the orifice is adjacent the container and a discharge position, and means for applying suction to the duct when the head is in the pick-up position and is moving from the pick-up position to the discharge position and for removing the suction when the head is in the discharge position, wherein a wiper member is mounted adjacent the path of the head from the pick-up position to the discharge position, the wiper member being arranged to wipe all the seeds but one from the head as the head moves past the member.

In a preferred construction, means are provided for applying air pressure to the duct when the head is in the discharge position, and the wiper member has a surface so shaped that as the head moves past the wiper member, the surface on the wiper member and a surface on the head surrounding the orifice define a tapering space, the narrower end of which is directed towards the discharge position and is of such a width that it prevents the passage of seeds through it, but the wider end of the space being wide enough to hold a seed whereby as the head moves past the wiper member, the seeds picked up from the container and held at the orifice by the suction are moved by the wiper member to positions in which they trail from the orifice and all the seeds but one are wiped from the head, but one seed remains in the space and is held by the head until the head has moved past the wiper member and this one seed is then discharged by the air pressure through the duct at the discharge position.

Preferably also, as is the case with conventional machines of the kind described initially, there are a number of similar heads arranged side by side in a row and all these heads are movable to and fro together in a direction perpendicular to the row. The wiper member then extends across the path of the row of heads.

According to a further preferred feature of the invention, the container is an elongated tray extending parallel to the row of heads, the tray having a bottom of shallow V-shaped cross-section, the apex of the V being located below the pick-up positions of the heads and part of the bottom on the side of the pick-up positions remote from the discharge positions being inclined at a shallow angle, and further comprising a vibrator for vibrating the tray as the heads approach their pick-up positions, the angle of inclination of the said part of the bottom being such that seeds deposited on the tray are caused by the vibrator to settle into a single layer on the said part of the bottom and slide down the said part to the apex where they are picked up by the heads.

The provision of the wiper member and in particular the shaping of the surface of the wiper member and the surface of the head surrounding the orifice to form the tapering or wedge-shaped space between the surface of the head and the surface of the wiper member is of primary importance. It has been discovered that by shaping the wiper member and the head in this way, it is possible to ensure with a very considerable degree of reliability that a single elongated pointed seed and only a single seed remains attached to the head after it has moved past the wiper member.

In the course of many experiments, various forms of wiper member were tried, but it was generally found that these wiper members either tended to remove all the seeds from the head or they frequently left at least two seeds carried by the head, particularly when two seeds both had their pointed ends held by the suction within the orifice of the head.

The case when one or more seeds had their pointed ends held within the orifice of the head makes the preferred feature that when the head is in the discharge position air under pressure is supplied through the duct very desirable. This is because with existing machines when the suction is released, but there is no flow of air out of the orifice, the seed or seeds having their pointed ends held within the orifice tend to remain jammed in the orifice and are not released from the head. The application of a positive air pressure through the orifice overcomes this problem completely and ensures that a seed held by the head is discharged at the discharge position.

The construction of the container as an elongated tray and the provision of a vibrator as described above is also very desirable in that it helps to improve still further the reliability with which each head delivers one seed and only one seed at the discharge position in each cycle of operations of the machine. This is because the feeding of the seeds in a single layer so that they form a line along the apex of the V-shaped tray ensures that in many cases each head only picks up a single seed, but a single seed is practically always picked up and the number of misses is reduced. As many of the heads can only carry a single seed, the work to be done by the wiper member is reduced and with a machine having these preferred features of the invention, an efficiency of 98% has been achieved. That is to say in 98% of a large number of movements of the head from the pick-up position to the discharge position, a single seed is discharged by the or each head at the discharge position. A tendency has been for there to be two seeds picked up in about 1% of the movements and for no seeds to be picked up, that is to say for there to be a miss, in the remaining 1%.

The surface of each head surrounding the orifice of the head is preferably flat and perpendicular to the axis of the orifice and the surface on the wiper member is curved. The head then moves from its pick-up position to its discharge position along a path which traverses the curved surface so that the space defined between the flat surface on the head and the surface on the wiper member gradually decreases in width, as the head moves, both at the leading end and the trailing end of the surface on the head so that at all times this space tapers, but the space as a whole gradually gets narrower and narrower as the head approaches the discharge position.

The extent of the flat surface surrounding the orifice on the, or each, head is also of importance since, when a seed is held with its pointed end sucked into the orifice, it is important that the seed should be bent over and not be crushed between the surface on the head and the surface of the wiper member. For use with lettuce seeds, the orifice has a diameter of substantially 0.3 mm and the surface surrounding the orifice is circular and has an external diameter of substantially 2 mm.

Whilst separate sources of suction and air under pressure may be provided for connection to the head or heads, the whole machine is preferably pneumatically operated by a supply of air under pressure. The head or heads are then swung to and fro by a pneumatic ram and this is preferably single acting to move the head or heads from the discharge position to the pick-up position. The return movement is then effected by a spring.

The suction to the duct of the, or each, head is then preferably provided by means of a venturi through which air is blown from the supply under pressure, the duct or ducts being connected to the throat of the venturi.

To be economic, it is desirable for the machine to operate at a speed of about one hundred cycles per minute and with conventional machines it is a comparatively simple matter to apply suction to the duct of each head and then to vent the duct one hundred times per minute. It is however much more difficult to apply suction to each duct and then to apply air under pressure to the duct followed again by suction at a speed of a hundred times per minute. This is because the air under pressure must be scavenged so that the duct is at a pressure below atmospheric pressure by the time the head has returned from the discharge position to the pick-up position.

To enable the machine to operate at a sufficiently high speed, the supply of air under pressure to the heads at the discharge position is preferably effected by the discharge of a quantity of air from a reservoir under pressure. In this way the total volume of air discharged through the ducts of all the heads is restricted by the volume of the reservoir and it is made such that the initial pressure generated in the duct is sufficient to blow out any seeds wedged in the orifices, but the pressure of the air rapidly decays owing to the restricted volume of the reservoir. The reservoir is then recharged with air at the same time as the suction is applied to the ducts during the movement of the heads from the discharge position back to the pick-up position.

To enable air under pressure to be discharged from a reservoir through the ducts as just described, the machine preferably has a pressurised air supply connection connected to the ducts through a venting valve and through a device which comprises the reservoir and a dump valve. The dump valve comprises a valve chamber having two oppositely directed valve seatings and a flexible disc-like valve closure member, which, when unflexed, seats on both seatings. The valve chamber has an inlet leading to one side of one seating, an outlet leading from the other side of the other seating to the ducts, and a transfer port leading from between the seatings to the reservoir. The arrangement of the dump valve is such that when air is supplied under pressure to the inlet, the closure member is flexed so that it is moved off one seating and the valve chamber together with the reservoir is pressurised, but the closure member remains on the other seating so that no air under pressure can flow through the ducts. When the supply of air under pressure to the inlet is vented by the venting valve, the air pressure from the reservoir acting upon the valve closure member moves the closure member off the other seating and onto the one seating so that the air under pressure in the reservoir is vented into the valve chamber and thence through the other seating to the ducts.

An example of a machine constructed in accordance with the invention is illustrated diagrammatically in the accompanying drawings in which:

FIGS. 4 and 5 are sections to a still larger scale through the wiper member and part of one head illustrating the operation of the wiper member in removing all the seeds but one from the head;

FIG. 6 is a still more highly diagrammatic illustration of the wiper member and of one head showing different modes in which one or moe seeds may be picked up by the head; and FIG. 7 is an end view of a pivotal mounting of a row of heads of the machine showing a mechanism for adjusting the position of the path of movement of the heads between the pick-up position and the discharge position.

Figure 1:
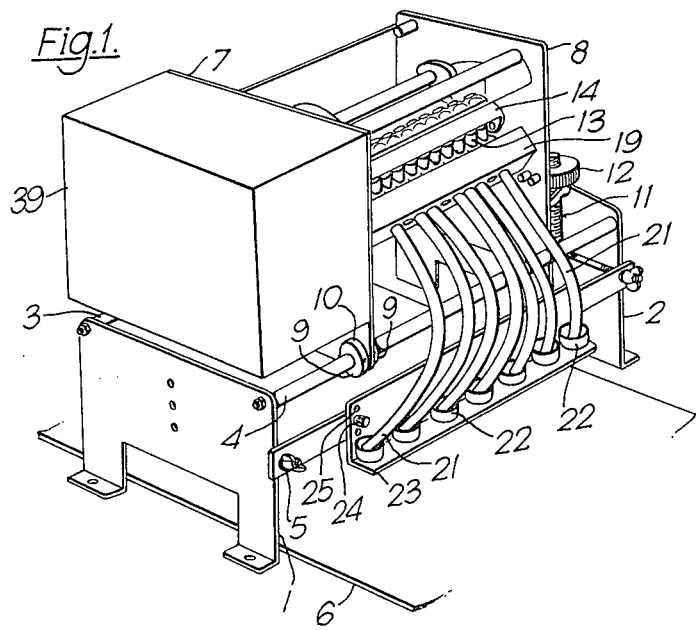
FIG. 1 is a perspective view of the machine from above and from one side.
Figure 2:
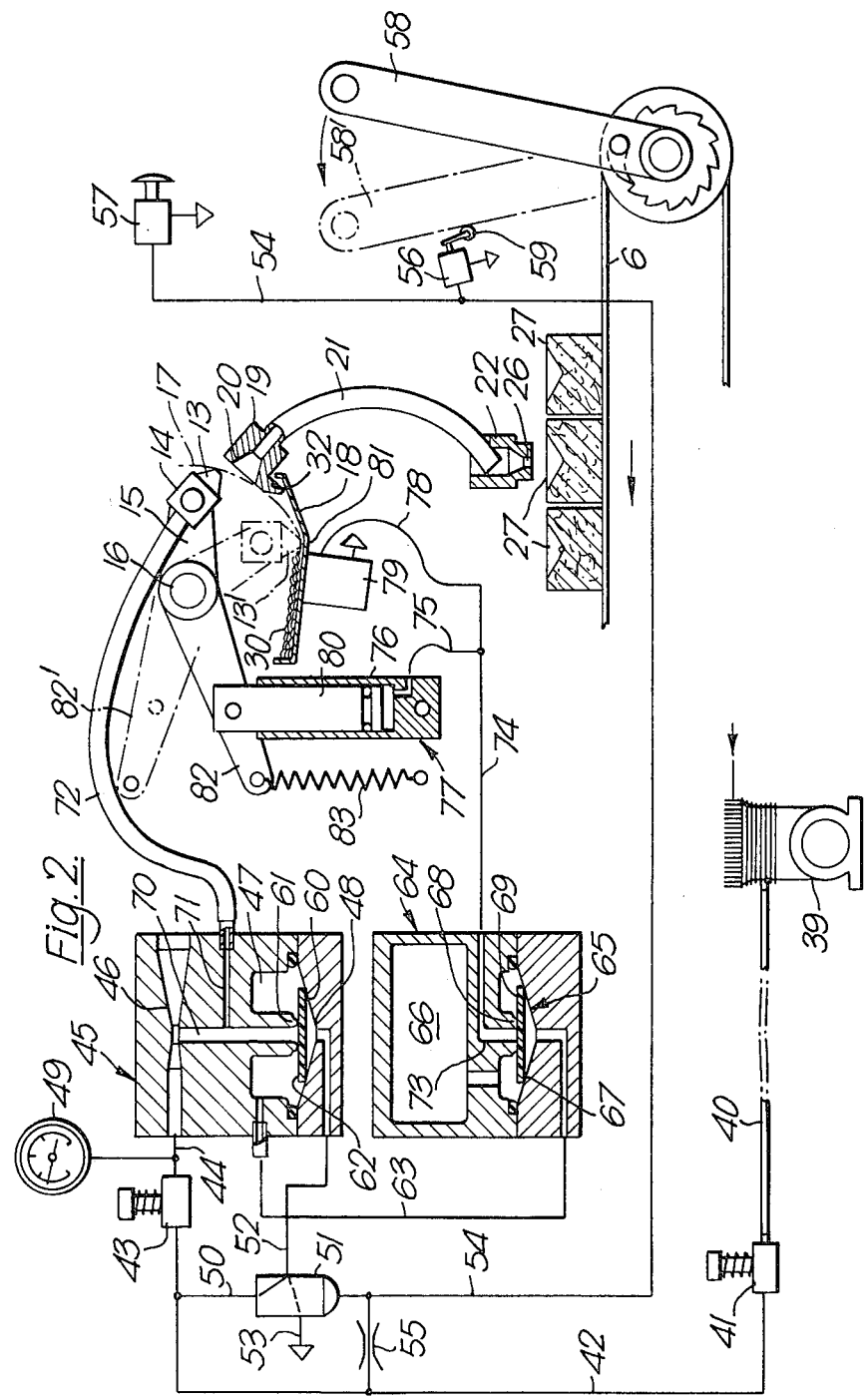
FIG. 2 is a pneumatic circuit diagram of the machine also illustrating some of the components of the machine in greater detail.

As shown in FIG. 1, the machine comprises a pair of side plates 1 and 2 which are interconnected by a pair of rods 3 and 4 and a strip 5. These parts together form a supporting framework for the machine and this supporting framework, in operation, is clamped to part of a framework (not shown) of a step-by-step conveyor 6 which is indicated in FIG. 2. Two further plates 7 and 8 together form a chassis on which the main parts of the machine and their operating mechanisms are mounted. To enable the main parts of the machine to be set level after the plates 1 and 2 have been fitted to a conveyor, the plate 7 is mounted on the rod 4 so that it can be rocked backwards and forwards, that is from left to right or right to left as seen in FIG. 1, and for this purpose the rod 4 passes through collars 9 which are fixed to the plate 7 and can be fixed angularly in position on the rod 4 by grub screws 10. The plate 8 is also attached to the rod 4 through a collar, which is not shown, and is connected to the collar by a levelling screw 11 having a handle 12. Turning of the levelling screw 11 enables the chassis formed by the plates 7 and 8 to be levelled laterally as well as backwards and forwards.

A row of suction and pressure heads 13, of which in this example there are ten, are carried by a suction and pressure manifold 14 which is mounted between the side plates 7 and 8. The ends of the manifold 14 are fixed to arms 15, one of which is shown in FIG. 2. The arms 15 are fixed to a shaft 16 which is mounted at its ends in bearings in the plates 7 and 8. This enables the lower ends of the heads 13 to be swung to and fro along an arcuate path 17, which is also shown in FIG. 2.

Also as shown most clearly in FIG. 2, a seed container in the form of a tray 18 of shallow V-shaped cross-section is mounted between the plates 7 and 8 below the row of heads 13. A bar 19 is fixed between the plates 7 and 8 immediately adjacent the right-hand edge of the tray 18 as seen in FIG. 2. The bar 19 is formed with ten funnel-shaped openings 20 one in lateral alignment with each of the heads 13. Hoses 21, which form chutes, lead from the bottoms of the openings 20 into receivers 22 which are mounted on a bracket 23 which is fixed to the strip 5.

In the example illustrated there are seven hoses 21 and seven receivers 22 because it is required to feed the seeds in rows of seven seeds. In this case the heads 13 which register with openings 20 which are not fitted with hoses 21 are closed and become inoperative. The number of hoses 21 and receivers 22 is varied in dependence upon the number of seeds required to be fed in each row up to a maximum of ten. To enable the change to be made, the bracket 23 is substituted by another bracket having the require number of receivers 22. The bracket 22 is fixed to the strip 5 by a pin 24 which fits in one of a number of holes 25 in the end of the bracket. There is a similar arrangement at the right-hand end of the bracket 23 as seen in FIG. 1. This enables the receivers 22, which have discharge openings 26 to be adjusted in position upwards and downwards so that seeds are discharged at the required distance above rows of nutrient blocks 27 on the conveyor 6 as shown in FIG. 2.

Figure 3:
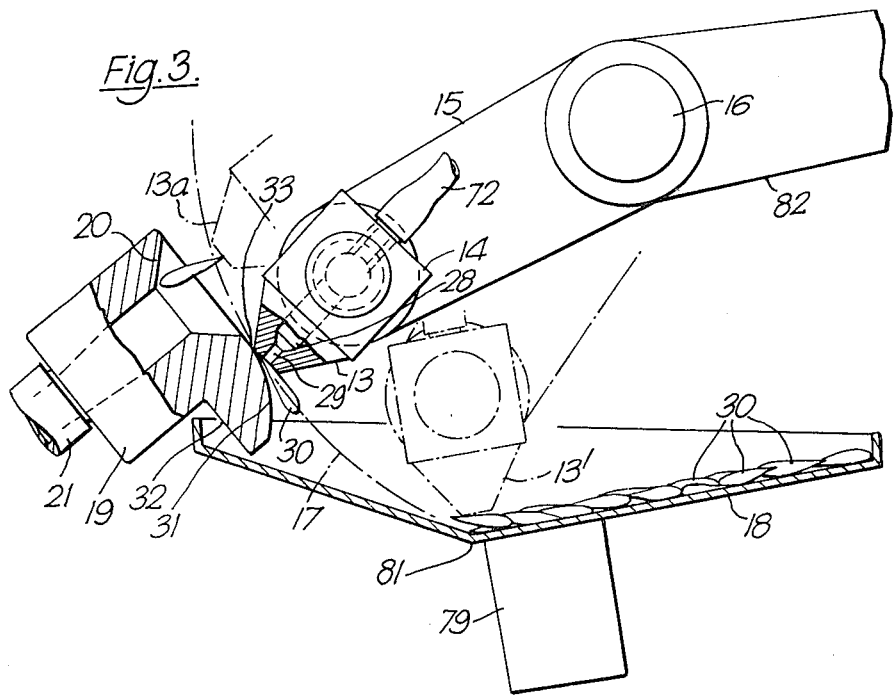
FIG. 3 is a section to a much larger scale than FIG. 1 through a seed container and a wiper member incorporating a seed discharge chute and showing also a portion of one head of the machine in section in its passage from its pick-up position towards its discharge position and just moving past the wiper member.

Each of the heads 13 has a duct 28 terminating in an orifice 29 (see FIG. 3) and suction and pressure are applied alternately through the ducts 28 and hence to the orifices 29.

As already explained in general terms, seeds 30 are placed in the tray 18 and these seeds are picked up, one or more by each of the heads 13 when these heads are swung into a pick-up position indicated in chain-dotted lines 13' in FIG. 2. The picking up of the seeds is effected by the application of suction through the ducts 28 when the heads are in the pick-up position. The heads then swing to the discharge position, which is the position shown in full lines at 13 in FIG. 2 and in their movement to the discharge position along the path 17 the heads pass very close to a surface 31 (see FIG. 3) of a lip 32 which projects from the bar 19 and forms a wiper member. In their passage over the surface 31 of the wiper member 32, all the seeds but one picked up by each of the heads 13 is wiped away from the orifice 29 and when the head reaches the discharge position shown in chain-dotted lines at 13a in FIG. 3, air under pressure is supplied through the duct 28 and the single seed is discharged into the appropriate one of the funnel-shaped openings 20 whence the seed falls down the chute formed by the hose 21 into the receiver 22 and thence through the outlet opening 26 into the block 27. After this has happened, the heads 13 swing back to the pick-up position 13' and while this is happening the conveyor 6 moves on one step to bring a new row of blocks 27 into position below the receivers 22. The whole cycle of operations is then repeated.

When the seeds deposited in the tray 18 are elongated and sharply pointed at one end such as lettuce seeds, a single seed may be picked up by the head in the manner shown at 30a or in the manner shown at 30d in FIG. 6, or alternatively two or more seeds may be picked up by a head as shown at 30b and 30c.

The manner in which the wiper member 32 acts to remove all the seeds but one from each head as the head moves past the surface 31 is shown in FIGS. 4 and 5. As shown in FIG. 4, as the head 13 approaches the surface 31, a tapering space 33 is formed between the surface 31 and a flat circular surface 34 surrounding the orifice 29. Owing to the curvature of the surface 31, the tapering space 33 is initially relatively wide and is sufficiently large to hold two seeds 30 which in this instance have been picked up by the head 13. However, as shown in FIG. 5, as the head 13 moves further along its path and approaches closer to the surface 31, the seeds 30 are pushed laterally away from the orifice 29 and the width of the tapering gap 33 is reduced until it is only sufficient to hold one seed 30. Even this seed is pushed away from the orifice 29, but the suction through the orifice 29 is sufficient to produce a suction in the gap 33 sufficient to hold the single seed 30 in the gap. This suction remains because the leading edge of the surface 34 is very close to the surface 31 and little air can therefore be drawn in at the leading narrow end of the space 33. The single seed 30 remains in the gap 33 until the surface 34 has moved beyond the surface 31 and at this time the seed 30 returns to the orifice 29 against which it is sucked directly. As already explained, the head 13 then reaches its discharge position and air under pressure is supplied through the orifice 29 so that the seed 30 is blown away from the orifice 29 into the funnel-shaped opening 29.

The minimum clearance between the surface 34 on the head and the curved surface 31 of the wiper member 32 and hence the width of the tapering space 33 will depend upon the size and shape of the particular seeds being fed. In the case of lettuce seeds, a gap of about 0.1 mm has been found satisfactory. This is with an orifice diameter of 0.3 mm and a surface 34 which is circular and has an external diameter of 2 mm. In this case the included angle between the surfaces 34 and 31 when the head is in the position shown in FIG. 5 is preferably about 20°.

To enable the minimum gap between the surfaces 34 of the heads and the surface 31 of the wiper member to be adjusted, the shaft 16 which supports the arms 15 carrying the heads 13 is supported in each of the plates 7 and 8 by an eccentric bearing bush 35 shown in FIG. 7. A crank arm 36 is fixed to the bearing bush 35 and is connected by a connecting rod 37 to a further crank arm 38 which is manually adjustable between the position shown in full lines at 38 in FIG. 7 and the position shown in chain-dotted lines at 38'. Adjustment of the crank arm 38 causes the crank arm 36 to move between the full line position shown at 36 and the chain-dotted line position shown at 36'. The position 36 provides a minimum clearance between the surfaces 34 and 31 and the position 36' provides a maximum clearance. A minimum clearance is suitable for use with lettuce and other elongated and pointed seeds; the maximum clearance is suitable for use with seeds such as cabbage seeds and a clearance in between is suitable for use with celery seeds.

The to and fro rocking movement of the heads 13 together with the alternating suction and air pressure at the orifices 29 is produced by pneumatic devices enclosed within a housing 39 shown in FIG. 1 of the drawings and by means of the pneumatic circuit shown in FIG. 2. Air under pressure is supplied by a compressor 39 through a line 40 to a pressure regulator 41 and thence through a further line 42 through a second pressure regulator 43 and a line 44 to a device 45 which includes a venturi 46, a small reservoir 47 and a dump valve 48. The line 44 between the pressure regulator 43 and the device 45 is fitted with a pressure gauge 49.

A branch line 50 leads from the line 42 to a three-port air-operated poppet valve 51. The valve 51 has one port connected by a line 52 to one side of the dump valve 48 in the device 45 and another port 53 vented to atmosphere. The valve 51 is operated by air from a line 54 and air under pressure is supplied to the line 54 from the line 42 through a throttle 55. The line 54 is provided with a trigger-operated venting valve 56 and a manually operated venting valve 57. The trigger-operated valve 56 is opened by an arm 58 of the conveyor 6 each time the conveyor 6 operates to move a new line of blocks 27 into position below the seed receivers 22. For this purpose the arm 58 moves into the positon shown at 58' in which it engages with a trigger 59 of the valve 56.

Thus the line 54 is normally pressurised with air at the pressure delivered from the regulator 41 and this causes the valve 51 to adopt the position shown in full lines in FIG. 2 in which air is supplied under pressure from the line 50 through the line 52 to the underside of the dump valve 48. However when the conveyor 6 moves one step, the arm 58 moves momentarily into the position shown in chain-dotted lines at 58' and this opens the valve 56 to vent the line 54 and hence the valve 51 because the out flow through the venting valve 56 is more rapid than the inflow through the throttle 55. The venting of the valve 51 causes its porting to change over to that shown in dotted lines in FIG. 2 so that the line 50 is shut off and the line 52 is vented through the vent 53.

The dump valve 48 has a first seat 60, a second seat 61 and a flexible disc 62 forming a valve closure member. When the venting valve 56 is closed and accordingly the valve 51 has the porting shown in full lines in FIG. 2, pressure is applied through the line 52 to the underside of the closure member 62 and in consequence the closure member 62 seats on the seat 61, but is deflected by the pressure on its underside off the seat 60 so that the air under pressure flows into the reservoir 47 and thence through a line 63. The line 63 is connected to a device 64 which contains a second dump valve 65, which is generally similar to the dump valve 48 and also contains a second reservoir 66. The dump valve 65 has a first seat 67, a second seat 68 and a flexible disc-like closure member 69.

When air under pressure flows through the line 63, the closure member 69 is moved by this pressure off the seat 67 and in consequence the second reservoir 66 is filled with air under pressure. When the pressure in the reservoir 66 is equal to that in the line 63 and also to that in the reservoir 47 and the line 52, the dump valve closure members 62 and 67 are both in engagement with both of their seatings.

The device 45 has a duct 70 leading from the seat 61 to the throat of the venturi 46. Since, under the conditions so far described air is supplied under pressure through the line 44 to the venturi 46, this produces a suction in the duct 70 and this in turn produces suction in a duct 71 and in a flexible tube 72 which connects the duct 71 to the manifold 14. Suction is thus produced through the manifold 14 and through the ducts 28 and the orifices 29 of the heads 13. This holds a single seed against the orifice 29 of each of the heads 13.

As soon as the venting valve 56 is opened by a movement of the arm 58, and a similar effect may be achieved by manually opening the venting valve 57 momentarily, the valve 51 changes over as already described and the pressure in the line 52 and thus the pressure below the valve closure member 62 of the first dump valve 48 is released. As soon as this happens, the air under pressure in the first reservoir 47 pushes the closure member 62 off its second seat 61 and the air under pressure in the reservoir 47 is discharged through the duct 70, overcoming the suction in this duct and a puff of air under pressure is discharged through the flexible tube 72 and hence through the orifices 29 to blow the seeds off the heads 13 whence they fall into the openings 20 and thence through the tubes 21 and the receivers 22 into the blocks 27 which have just been moved into positon below the receivers 22. The puff of air through the tubes 72 is delivered very rapidly and as soon as this has happened, the closure member 62 returns to its seat 61 and suction is restored through the orifices 29.

As the pressure drops in the first reservoir 47, pressure also drops in the line 63 and so does the pressure below the closure member 69 of the second dump valve 65. As soon as this happens, the air under pressure in the second reservoir 66 moves the closure member 69 off its seating 68 and the air in the reservoir 66 which is of substantially greater volume than the reservoir 47, is discharged through a duct 73 in the device 64. The duct 73 leads to a line 74 which in turn leads to a line 75 connected to a cylinder 76 of a single-acting pneumatic ram 77. The line 74 is also connected to a line 78 which leads to a pneumatically operated vibrator 79 fixed to the underside of the tray 18.

The air discharged from the reservoir 66 thus performs two functions. Firstly it causes a piston 80 of the ram 77 to be extended and secondly it operates the vibrator 79 for a short time and vibrates the seeds 30 to distribute them evenly over the bottom of the left-hand side of the tray 18 as shown in FIG. 2 and cause a line of seeds to advance down the left-hand side of the tray 18 to the apex 81 of the tray.

The piston 80 is pivotally connected to an arm 82 which is fixed to a shaft 16 and is also acted upon by a return spring 83. Upward movement of the piston 80 thus swings the arm 82 upwards into the position shown in chain-dotted lines at 82' and this moves the heads 13 from the discharge position shown in full lines in FIG. 2 to the pick-up position shown in chain-dotted lines at 13'. Since at this time suction is again being applied to the orifices 29, these each pick up one or more seeds.

As soon as the air in the reservoir 66 has been fully discharged, the arm 82 and the piston 80 are returned to the positions shown in full lines in FIG. 2 by the return spring 83 and this swings the heads 13 back to the discharge position and in so doing causes them to pass over the surface 31 of the wiper member 32 so that all the seeds but one are wiped from each of the heads.

The machine is then ready to discharge a further row of seeds as soon as the arm 58 moves once again into the position 58' to move a row of blocks 27 into position to receive the seeds.

The whole cycle of operation just described then continues time after time until the machine is stopped. This can of course be done by disconnecting the pressure supply or alternatively the machine can be stopped temporarily by opening the venting valve 57 and holding it open.

We claim:

1. In a machine for picking up seeds from a mass of seeds and depositing said seeds individually, said machine comprising a suction head, means defining a suction duct terminating in an orifice in said head, a container for holding said mass of seeds, a mechanism for moving said head to and fro along a path between a pick-up position in which said orifice is adjacent said container, and a discharge position, and means for applying suction to said duct when said head in said pick-up position and said head is moving from said pick-up position to said discharge position and for removing said suction when said head in said discharge position, the improvement comprising a wiper member and means mounting said wiper member adjacent said path of said head from said pick-up position to said discharge position, said wiper member including means defining a surface configured in relation to said head and said path whereby all seeds but one picked up by said head are wiped from said head as said head moves past said wiper member.

2. A machine as claimed in claim 1, further comprising means for applying air pressure to said duct when said head is in said discharge position, and said surface of said wiper member being so configured that as said head moves past said wiper member said surface and a surface on said head surrounding said orifice define a tapering space, said space having a narrow end and a wide end, said narrow end being of such a width that it prevents the passage of seeds through it, and said wide end being wide enough to hold a seed, whereby as said head moves past said wiper member, seeds picked up from said container are held at said orifice by said suction are moved by said wiper member to positions in which they trail from said orifice and all said seeds but one are wiped from said head, but a single seed remains in said space and is held by said head until said head has moved past said wiper member and said single seed is then discharged by air pressure applied to said duct.

3. A machine as claimed in claim 1, comprising a plurality of similar heads and means mounting said heads side by side in a row, said heads all being movable to and fro by said mechanism in a direction perpendicular to said row, and said wiper member extending parallel to said row across the path of said row of heads.

4. A machine as claimed in claim 3, wherein said container comprises an elongated tray and means mounting said tray parallel to said row of heads, said tray including a bottom of shallow V-shaped cross-section having an apex, said apex being located below said pick-up position of each of said heads and said bottom including a portion on the side of said pick-up position of each of said heads remote from said discharge position of each of said heads, said portion being inclined at a shallow angle, and further comprising a vibrator for vibrating said tray as each of said heads approaches said pick-up position, the angle of inclination of said portion being such that seeds deposited on said tray are caused by said vibrator to settle into a single layer on said portion and slide down said portion to said apex where said seeds are picked up by said heads.

5. A machine as claimed in claim 3, in which each of said heads includes a surface surrounding said orifice of said head, said surface being flat and perpendicular to the axis of said orifice and said surface on said wiper member being curved, each of said heads moving from its pick-up position to its discharge position along a path which traverses said curved surface whereby the space defined between said flat surface on said head and said curved surface of said wiping member gradually decreases in width as said head moves towards said discharge position both at the leading end and the trailing end of said flat surface on said head so that at all times the space tapers, and said space as a whole gradually decreases in width as said head approaches said discharge position.

6. A machine as claimed in claim 5, in which said orifice of each of said heads has a diameter of substantially 0.3 mm and said flat surface surrounding said orifice is circular and has an external diameter of substantially 2 mm.

7. A machine as claimed in claim 3, further comprising a discharge chute provided for each of said heads at said discharge position of said head, said chute comprising means defining a funnel-shaped opening and a flexible tube communicating with said funnel-shaped opening, said head being arranged to discharge said seed into said funnel-shaped and said tubes having discharge ends which are adjustable in position.

8. A machine as claimed in claim 3, further comprising means for connection to a supply of air under pressure and said mechanism including means pivotally mounting said heads for to and fro swinging movement between said pick-up position and discharge position, a single-actiing pneumatic ram operative to swing said heads from said discharge position to said pick-up position, spring means operative to swing said heads in a direction from said pick-up position to said discharge position, verturi means having a throat, means connecting said ducts to said throats and means communicating said ram and said venturi means with said air supply connection means.

9. A machine as claimed in claim 8, wherein said means for applying air pressure to said ducts when said heads are in said discharge position includes a reservoir, means communicating said reservoir with said air supply connection means to pressurise said reservoir, and means for discharging said reservoir through said ducts, said means for discharging said reservoir through said ducts simultaneously disconnecting said reservoir from said air supply connection means.

10. A machine as claimed in claim 9, further comprising a venting valve and a device including said reservoir and a dump valve connected between said air supply connection means and said ducts, said dump valve comprising means defining a valve chamber, means defining two oppositely directed valve seatings in said chamber and a flexible disc-like valve closure member, which, when unflexed seats on both said seatings, means defining an inlet to said chamber leading to one side of one of said seatings, means defining an outlet from said chamber leading from the other side of the other of said seatings to said ducts and means defining a transfer port leading from between said seatings to said reservoir, said dump valve being so arranged that when air is supplied under pressure to said inlet said closure member is flexed so that it is moved off said one seating and said chamber together with said reservoir are pressurised, but said closure member remains on the other of said seatings so that no air under pressure can flow through said ducts, and when said supply of air under pressure to said inlet is vented by said venting valve, air pressure from said reservoir acting upon said valve closure member moves said closure member off the other of said seatings and onto one of said seatings, whereby said air under pressure in said reservoir is vented into said valve chamber and thence through the other of said seatings to said ducts.

11. A machine as claimed in claim 10, wherein said device also includes said venturi means and said venturi means includes an inlet connected to said air supply connection means and said throat of said venturi connected to the downstream side of said other of said seatings.

12. A machine as claimed in claim 10, further comprising a trigger means for operating said venting valve, said trigger means, in operation of said machine, being actuated by a step-by-step conveyor by which nutrient blocks are conveyed to said machine whereby said heads of said machine are caused to discharge a row of seeds each time said conveyor moves one step.

13. A machine as claimed in claim 12, in which said pneumatic ram is connected to a further device comprising a further reservoir and a further dump valve, said further dump valve being similar to said first mentioned dump valve, said further dump valve communicating with said air supply connection means and said venting valve whereby when said venting valve is triggered by said trigger means and seeds have been discharged from said heads, a pulse of air is discharged from said further reservoir into said ram to cause said ram to move said heads into said pick-up position to pick-up further seeds from said container, said spring then moving said heads back to said discharge position where said heads remain until said venting valve is again triggered by said trigger means.

* * * * *